Figure 1:
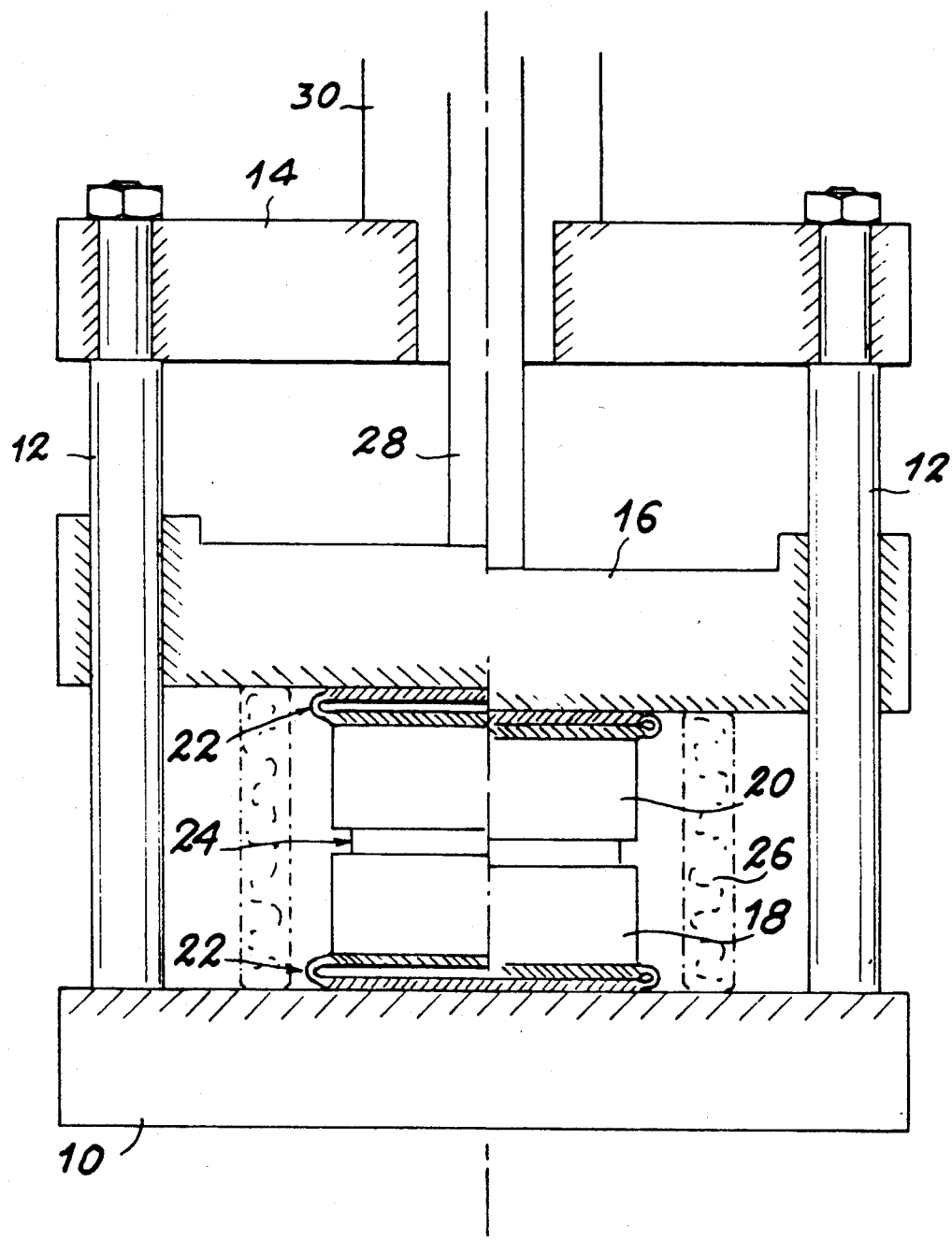

United States Patent [19]

Cusson et al.

[11] Patent Number: 5,156,087
[45] Date of Patent: Oct. 20, 1992

[54] VARIABLE HEAT CONDUCTION DEVICE TO BE PLACED BETWEEN A HEATING PLATEN AND A COOLING PLATEN OF A MACHINE SUCH AS A PRESS

[75] Inventors: Philippe Cusson; Eric Sixdeniers, both of Paris, France

[73] Assignee: Aerospatiale Societe Nationale Industrielle, France

[21] Appl. No.: 830,592

[22] Filed: Feb. 4, 1992

[30] Foreign Application Priority Data

Feb. 11, 1991 [FR] France ................... 91 01535

[51] Int. Cl.⁵ .............................. B30B 15/34
[52] U.S. Cl. .................. 100/93 P; 425/407; 165/32
[58] Field of Search .......... 100/93 P, 269 A; 165/32 HV; 425/407, 411, 430, DIG. 9

[56] References Cited

U.S. PATENT DOCUMENTS

| | | |
|---|---|---|
| 1,942,251 | 1/1934 | Mains . |
| 2,532,501 | 12/1950 | Johnson . |
| 2,874,751 | 2/1959 | Norton . |
| 3,808,968 | 5/1974 | Notin ............... 100/269 A |
| 3,957,107 | 5/1976 | Altoz ............... 165/32 HV |
| 4,190,484 | 2/1980 | Pohl ................ 100/269 A |
| 4,550,057 | 10/1985 | Kataoka ............... 428/215 |
| 4,806,195 | 2/1989 | Namysl ............ 100/269 A |

FOREIGN PATENT DOCUMENTS

| | | |
|---|---|---|
| 57-135137 | 8/1982 | Japan . |
| 1152141 | 5/1969 | United Kingdom .......... 100/269 A |

*Primary Examiner*—Harvey C. Hornsby
*Assistant Examiner*—Randall Edward Chin
*Attorney, Agent, or Firm*—Hayes, Soloway, Hennessey & Hage

[57] ABSTRACT

In a machine such as a press having at least one heating platen and one cooling platen, it is proposed to place between the said platens a variable heat conduction device (22a), when the operation of the machine requires a phase of heating the part without the application of pressure, followed by a phase of cooling the part under pressure. This device (22a) has two thermally conductive plates (32a, 34a), normally separated by a space under vacuum (52a) under the action of at least one deformable member (36a), which can be elastic or plastic. The application of the pressure passes the device (22a) from a thermally insulating state to a thermally conductive state.

12 Claims, 3 Drawing Sheets

VARIABLE HEAT CONDUCTION DEVICE TO BE PLACED BETWEEN A HEATING PLATEN AND A COOLING PLATEN OF A MACHINE SUCH AS A PRESS

DESCRIPTION

The invention relates to a variable heat conduction device for placing between a heating platen and a cooling platen of a machine, such as a press, making it possible to apply a compressive stress between these platens.

More specifically, the device according to the invention is designed in order to ensure a maximum effective thermal insulation between the platens when they are pressed against one another, but to ensure a maximum thermal conduction between the platens when a compressive stress in applied thereto.

One or more devices designed in this way can be used on a press equipped with at least one heating platen and at least one cooling platen, when the manufacture of the part requires its heating, prior to a pressure application and cooling phase.

A first example of use of the device according to the invention relates to the manufacture of a part by thermoforming, which involves a phase of heating the part, followed by a pressing phase, at a pressure preferably exceeding 1 MPa and during which the part is cooled.

A second example of use of the device according to the invention relates to the manufacture of a composite material with a metal die, which takes place in a mould within which are placed a preformed fitting which will serve as a reinforcement for the part, as well as metal foils for shaping the die. During a first stage, the mould is heated for a few hours in order to melt the metal foils, without any pressure being applied. During a very short second stage (a few minutes), a pressure is applied to the part, so that the metal in the liquid state impregnates the metal die. Finally, the assembly is cooled, whilst maintaining the pressure applied to the part in a homogeneous manner, because the calories escape uniformly over the entire surface of the mould.

In the present state of the art, when the manufacture of a part makes it necessary to subject it to heating without compression, followed by compression and cooling, there is no technical solution which is satisfactory from the thermal standpoint.

Thus, when the heating platen is directly in contact with the platen of the press equipped with cooling means, there is a significant heat loss by heat conduction during the heating phase. Conversely, if a thermally insulating material is placed between the press platen and the tool, the part is not cooled under satisfactory conditions.

The invention specifically relates to a variable heat conduction device, whose design enables it to be thermally insulating when not exposed to a given compressive stress and then becomes thermally conductive when such a compressive stress is applied thereto.

According to the invention this result is obtained by means of a variable heat conduction device for insertion between a heating platen and a cooling platen of a machine making it possible to apply a compressive stress between the said platens, said device being characterized in that it comprises two plates, which can be inserted between the platens and define between them a vaccum insulating space, and at least one deformable member bearing on each of the said plates, said member occupying an expanded state in which the plates are thermally insulated from one another by the vacuum insulation space when said stress is not applied, whereas, when the compressive stress is applied, the member occupies a compressed state in which the plates are in thermal contact with one another.

When a device designed in this way is placed between a heating tool and the cooled platen of a press, said tool is thermally insulated from the remainder of the machine, so that the heating of the part is ensured with minimum thermal losses, i.e. with an excellent thermal efficiency.

Conversely, the two plates of the device come into thermal contact with one another as soon as an adequate compressive stress is applied between them, which makes it possible to ensure an effective cooling of the part exposed to said compressive stress with the aid of the cooled platen of the machine.

As a function of the particular case, the deformable member or members of the device according the invention can be elastic or plastic. In the first case, the device can be permanently placed on the machine and interventions are limited to the conventional maintenance thereof. In the second case, it is necessary to replace the deformable member whenever the machine is operated.

In a first embodiment of the invention, the deformable member is a tight, sealed member, which is interposed between the peripheral parts of the plates and which internally defines the vacuum insulation space, which extends between the plates when the tight member occupies its expanded state.

In certain cases, a rigid element, which can be dismantlable and/or thermally insulating, forms part of a stack placed between the plates and incorporating the deformable member.

In a second embodiment of the invention, the device comprises several deformable members distributed between the plates and bearing in thermally insulated cavities, formed in the surfaces facing the two plates, thermally insulating sealing means connecting the peripheral edge of the plates and internally defining the vaccum insulation space, which extends between the plates when the members occupy their expanded position. In this case, the sealing means can comprise a thermally insulating material ring and sealing joints interposed between said ring and the peripheral edges of the plates.

In order to aid the thermal contact between the plates during the application of a compressive stress to the device, the plate adjacent to the cooling platen is covered by a ductile material layer on its face turned towards the other plate.

If it is wished that the cooling of the part is not to be the same in the considered zones of the part, it is possible to cover the plate adjacent to the heating platen by a conduction sheet formed from juxtaposed sheet elements, made from materials having different heat conduction characteristics, on its face turned towards the other plate.

In order to further improve the thermal insulation quality obtained when the two plates of the device are separated by the vacuum, it is possible to give the surface of the plate adjacent to the cooling platen a reflecting character and to cover the surface facing the plate adjacent to the heating platen with a black body.

The invention is described in greater detail herinafter relative to non-limitative embodiments and with reference to the attached drawings, wherein show:

FIG. 1 A front, part sectional view diagrammatically showing a press, whose two platens act on a heating tool via two variable heat conduction devices according to the invention.

Figure 2:
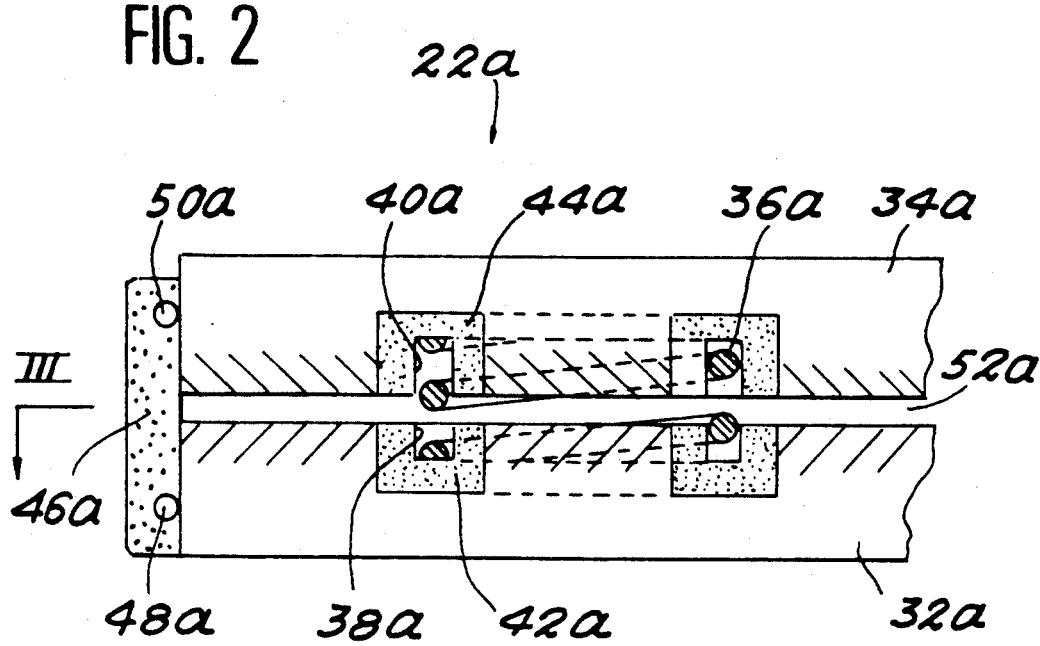

FIG. 2 A vertical sectional front view illustrating on a larger scale a variable heat conduction device according to a first embodiment of the invention.

Figure 3:
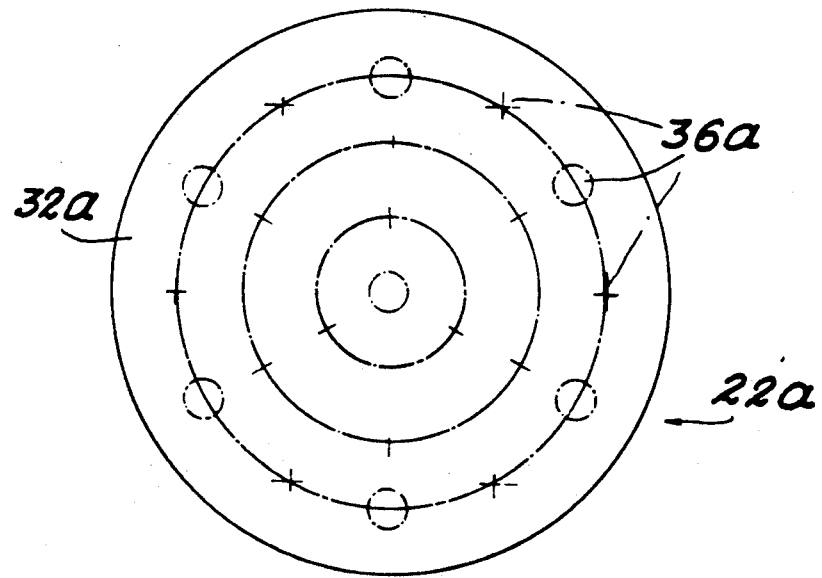

FIG. 3 A diagrammatic sectional view along line III of FIG. 2.

Figure 4:
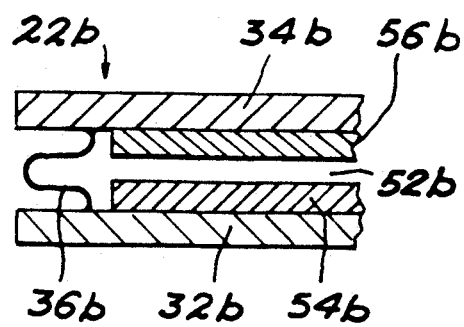
Figure 4:
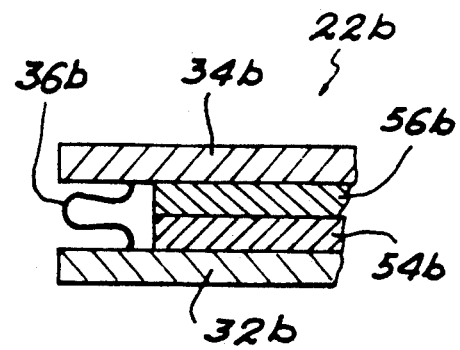

FIGS. 4a and 4b Vertical sectional views comparable to FIG. 2 illustrating a second embodiment of the device according to the invention, respectively in its expanded state and in its compressed state.

Figure 5:
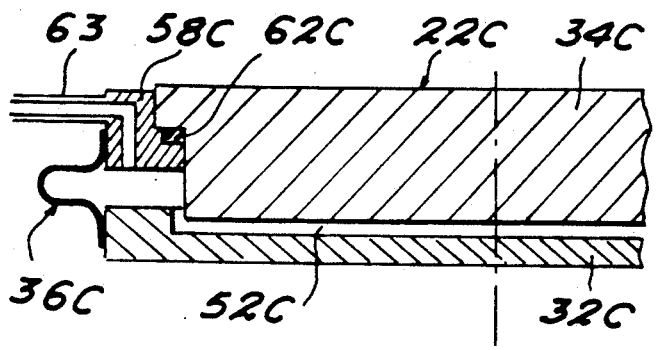

FIG. 5 A vertical sectional view comparable to FIG. 2 illustrating a variant of the second embodiment of the invention.

Figure 6:
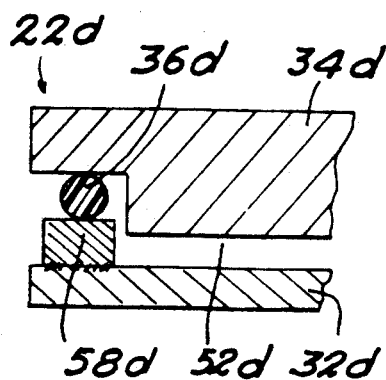
Figure 6:
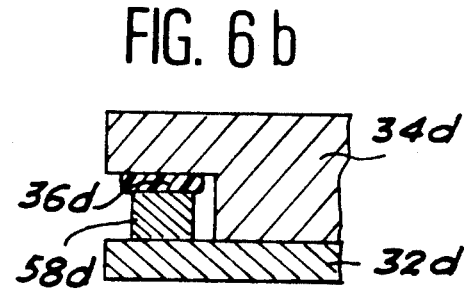

FIGS. 6a and 6b Vertical sectional views comparable to FIGS. 4a and 4b illustrating a second variant of the device illustrated in the drawing.

Figure 7:
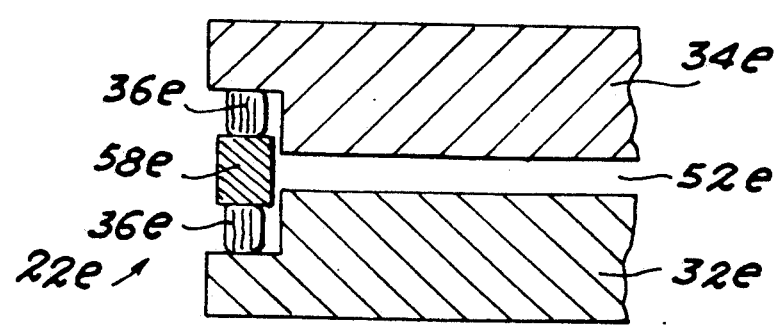

FIG. 7 A vertical sectional view comparable to FIG. 5 illustrating another variant of the second embodiment of the invention, in the case where the deformable member interposed between thr plates is a plastic member.

FIG. 1 very diagrammatically shows a press equipped with two variable heat conduction devices according to the invention. This press has a not shown lower frame on which is mounted a lower cooling platen 10 equipped with not shown cooling means. These cooling means generally incorporate a duct in which flows a cooling fluid at low temperature when a cooling of the part is desired.

At the four corners of the lower cooling platen 10, the machine frame supports four vertical guidance columns 12, whose upper ends are fixed to the four corners of an upper plate 14 of the frame. An upper cooling platen 16, internally equipped with not shown cooling means and identical to those equipping the lower platen 10, is slidingly received on the vertical guidance column 12.

On their facing faces, the lower 10 and upper 16 cooling platens respectively carry a lower heating platen 18 and an upper heating platen 20, via two variable heat conduction devices 22 according to the invention. Each of the heating platens 18 and 20 is internally equipped with not shown heating means e.g. constituted by heating resistors or any other equivalent means. The veriable heat conduction device 22 according to the invention are very diagrammatically illustrated in the left and right-hand halves of FIG. 1, respectively in their expanded state and in their compressed state. Between the lower heating platen 18 and the upper heating platen 20 is placed a tool 24, such as a mould, in which has been introduced beforehand the components of the part to be manufactured.

In order to avoid convection heat losses during the use of the heating means equipping the heating platens 18, 20, a thermally insulating annular member 26 is placed around the stack formed by the tool 24, the heating platens 18, 20 and the devices 22, between the cooling platens 10 and 16. Said annular insulating member preferably has, in plan view, a circular shape, as do the peripheral edges of the platens 18 and 20 and the devices 22.

The upper cooling platen 16 is centrally connected by a vertical thrust rod 28 to a member 30, such as a jack, mounted on the upper platens of the chassis 14 and which can apply to the upper cooling platen 16 a downwardly directed, vertical compressive stress, which has the effect of passing the devices 22 into their compressed state illustrated in the right-hand part of FIG. 1. As will be shown in greater detail hereinafter, when they are in the compressed state the devices 22 ensure a very good heat conduction between the heating platens 18, 20 on the one hand and the cooling platens 10, 16 on the other.

Conversely, when the jack 30 is not actuated, the devices 22 according to the invention occupy their expanded state illustrated in the left hand half of FIG. 1, in which the heating platens 18, 20 are thermally insulated from the cooling platens 10, 16 respectively.

Different embodiments of the variable heat conduction devices 22 according to the invention will now be described with successive reference to FIGS. 2 to 7.

In each of the embodiments and variants which will now be described, corresponding elements will be designated by the same reference numeral, followed by a different letter. Thus, in the first embodiment of the variable heat conduction device according to the invention as illustrated in FIGS. 2 and 3, said device is designated by the general reference 22a.

The device 22a comprises two planer, parallel, circular plates 32a, 34a, made from a thermally conductive material such as stainless steel and preferably having a limited thickness. In this embodiment, the device 22a also has several deformable members 36a interposed between the plates 32a, 34a and regularly distributed between them, e.g. in accordance with three concentric circles, as is very diagrammatically shown in FIG. 3.

As is shown in FIG. 2, each of the deformable members 36a is in this case constituted by a helical spring, whose ends are received and bear in annular cavities 38a, 40a respectively formed in the facing surfaces of the plates 32, 34a. Each of the cavities 38a, 40a is thermally insulated from the corresponding plate by an insulating material block 42a, 44a respectively.

The characteristics of the springs constituting the deformable members 36a are such that the facing surfaces of the plates 32a, 34a are normally spaced from one another by a few millimeters, as illustrated in FIG. 2. The space 52a formed in this way between the plates is closed, in the represented embodiment, by a ring-shaped, tight, sealed member 46a, which is mounted around the plates 32a, 34a. Annular sealing joints 48a and 50a fitted in said member 46a are respectively in tight contact with the peripheral edges of the plates 32a, 34a. This member 46a is made from a thermally insulating material, such as a ceramic material.

The closed space 52a formed between the plates 32a, 34a is externally defined by the member 46a and placed under vacuum, so as to form an insulating space between the plates. This placing of the space 52a under vacuum can be brought about in any way, e.g. by means of a not shown pipe connected to a vacuum generating installation and issuing on the periphery of the space 52a through the member 46a.

When the device 22a illustrated in FIGS. 2 and 3 is not subject to the action of a compressive stress exceeding that stored in the springs constituting the deformable members 36a, said device occupies its expanded state illustrated in FIG. 2, in which there is a very good thermal insulation between the plates 32a and 34a. In this expanded state of the devices 22a, the heating means contained in the heating platens 18, 20 of the press illustrated in FIG. 1 can be used with a maximum efficiency, because the heating platens 18 and 20 are thermally insulated from the cooling platens 10, 16 by the vacuum present between the plates 32a, 34a of the devices 22a.

Conversely, when a compressive stress exceeding the prestress stored in the springs constituting the deformable members 36a is applied to the device 22a, the facing faces of the plates 32a, 34a come into contact with one another, so that there is a good heat conduction between the plates. Consequently, if the heating means equipping the platens 18, 20 are stopped and the cooling means equipping the platens 10, 16 put into operation, the cooling of the part through the devices 22a takes place under optimum conditions.

On referring to FIGS. 4a and 4b, a description will now be given of a second embodiment of the invention, in which the deformable members interposed between the facing faces of the two plates in the embodiment described hereinbefore are replaced by a single deformable member connecting the plates at their periphery.

More specifically and as illustrated by FIGS. 4a and 4b, in said second embodiment of the invention the variable heat conduction device 22b has a single tight, sealed deformable member 36b in the form of an annular bellows made from an elastic material such as stainless steel. The ends of said deformable bellows-like member 36b are sealingly connected to the periphery of the two plates 32b, 34b, whose structure and function are comparable to those of the plates 32a, 34a in the first embodiment described relative to FIGS. 2 and 3.

The ends of the bellows-like member 36b can be directly welded to the facing faces of the plates 32b, 34b, in the vicinity of the peripheral edge of said plates and as illustrated in FIGS. 4a and 4b.

In this embodiment, the deformable member 36b has the double function of ensuring the spacing of the plates 32b, 34b in the expanded state of the device illustrated in FIG. 4a, whilst ensuring the peripheral sealing of the space 52b, which is then formed between the plates 32b and 34b.

In order that the facing surfaces of the plates 32b and 34b can bear against one another when the member 36b is compressed by the operation of the press, despite the thickness of said member 36b, the ends of said member can be welded to the shoulders formed on the facing faces of the two plates in the vicinity of their peripheral edges.

As is illustrated in FIGS. 4a and 4b, the facing faces of the plates 32b and 34b can also be planar and coated, within the annular member 36b, respectively with a conduction sheet 54b for the plate 32b and a ductile material layer 56b for the plate 34b. The thicknesses of the sheet 54b and the layer 56b then exceed the thickness of the member 36b in the compressed state (FIG. 4b).

It should be noted that the presence on the facing faces of the two plates of the device of a ductile material layer like the layer 56b for the plate intended to be in contact with the cooling platen and a conduction sheet for the plate to be in contact with the heating platen is recommended in all embodiments of the invention, including that already described relative to FIGS. 2 and 3.

The ductile material layer 56b is formed from a material such as aluminium, which has both an excellent heat conduction and a ductile character at the heating temperature of the part. During the application of the pressure in the manner illustrated in FIG. 4b, it makes it possible to perfectly adapt the surface of the plate 34b in contact with the plate 32b. The thermal contact between the two plates is consequently considerably improved.

Moreover, the conduction sheet 54b is advantageously constituted by several juxtaposed sheet elements, which are all made from thermally conductive materials. However, these materials are chosen so as to have different thermal conduction characteristics as a function of the facing areas of the part, which makes it possible to bring about a controlled cooling at different speeds between the individual zones.

The operation of the device 22b described relative to FIGS. 4a and 4b is completely identical to that of the device 22a described relative to FIGS. 2 and 3.

FIG. 5 shows a variant of the second embodiment of the device according to the invention. In this variant, the device 22c also has two plates 32c and 34c tightly connected at their periphery by an annular member 36c in the form of an elastic bellows. However, only one of the ends of the member 36c is welded to a peripheral edge of the plate 32c, which can be in contact with the cooling platen. The second end of the member 36c is welded to a peripheral edge of an annular element 58c, which bears by a shoulder on a shoulder facing the plate 32c, which can come into contact with the heating platen. The sealing between said annular element 58c and the plate 34c is then obtained by means of an annular sealing joint 62c located in a groove formed in the shoulder of the annular element 58c.

In this variant illustrated in FIG. 5, the dismantlable character of the element 58c makes it possible to dismantle the device, which in particular makes it possible to modify or replace the plate 34c. The machined plate 34c of a good heat conducting material such as copper can come into direct contact with most of the surface of the plate 32c, when a compressive stress is applied between the platens.

In the variant illustrated in FIG. 5, the annular element 58c is preferably a metallic element, in order to facilitate the welding of the corresponding end of the annular member 36c. It should also be noted that the sealing joint 62c is located in the center of the cold portions of the device 22c, so that it can be made from a conventional elastomeric material.

Moreover, FIG. 5 shows an example of a duct 63 traversing the annular element 58c, so as to connect the interplate space 52c to a not shown vacuum generating installation.

In the constructions described hereinbefore with reference to FIGS. 4a, 4b and FIG. 5, the annular members 36b, 36c constitute heat bridges by which a slight thermal leak by conduction can occur when the device occupies its expanded state. This thermal leak is generally acceptable.

In cases where a complete thermal insulation between the plates of the device is desired, it is possible to use an arrangement similar to that of FIG. 5, by making the annular element 58c from a thermally insulating material, such as a ceramic material. A solution of this type will now be described relative to FIGS. 6a and 6b.

In this case, the device 22d according to the invention comprises, besides the two plates 32d and 34d, an annular elastic member 36d, which can in particular be in the form of a rubber O-ring. The latter bears on the one hand directly on the plate 34d and on the other on an annular element 58d interposed between the O-ring and the plate 32d and made from a thermally insulating material, such as a ceramic material. The seal between the annular element 58d and the plate 32d can be brought about by means of a sealing joint, as has been described relative to FIG. 5, or by any equivalent means.

FIG. 7 shows another variant of the variable heat conduction device according to the invention, in which the deformable member interposed between the plates is a plastic member, which must be replaced whenever the device is put into operation.

More specifically, the device 22e illustrated in FIG. 7, as hereinbefore, comprises two heat conducting plates 32e, 34e. Between the peripheries of these plates is placed a stack constituted by an annular element 58e, made from a thermally insulating material such as a ceramic, interposed between two plastic joints 36e, e.g. of laminated carbon. Each of these joints 36e is in direct contact with the annular element 58e, which ensures the thermal insulation between the plates, and with each of the plates 32e, 34e.

In all the embodiments described hereinbefore, as well as in the not described variants devolving therefrom, the space formed between the two plates of the device is placed under a vacuum with the aid of a not shown circuit issuing into the said space. An excellent thermal insulation between the two plates and consequently between the platens of the machine in contact with said plates is thus brought about when a compressive stress adequate for bringing the plates into contact with one another is not applied to the device.

This thermal insulation is advantageously improved by reducing the thermal losses by convection. This is obtained by giving the surface of the plate in contact with the cooling platen a reflecting nature making it possible to reflect the heat arriving by radiation of the plate in contact with the heating platen. Moreover, the surface of the plate in contact with the heating platen is advantageously covered by a black body enabling it to absorb the radiation reflected by the reflecting surface of the other plate.

Obviously, the surfaces in question are either the surfaces of the plates when the latter are not covered with a ductile material layer or a conduction sheet, or the surfaces of said layer or sheet when they are present.

In all cases, when an adequate compressive stress for compressing the deformable member of the device is exerted by the machine, the two plates of the device come into thermal contact with one another, so that an excellent thermal conduction is then established between the heating platen and the cooling platen of the machine. An effective cooling of the part can then take place by cooling means equipping the latter platen.

As has already been stated, the insertion of one or more devices according to the invention in a machine such as a press makes it possible to significantly improve the manufacture of a part by thermoforming, as well as the manufacture of composite materials with a metal die. Thus, in both cases, the manufacturing cycle involves a first stage during which the part must be heated without the application of pressure and a final stage during which the part must be cooled and compressed simultaneously.

Obviously, the invention is not limited to the embodiments described in exemplified manner hereinbefore and in fact covers all variants thereof.

Thus, the deformable member bearing on the two plates of the device can also be made from a material having the property of being thermally insulating in its expanded state, whilst becoming thermally conductive when it is exposed to a compressive stress exceeding a certain threshold.

Moreover, the different embodiments and variants described can be combined. Thus, the compression springs placed between the plates of the device in the first embodiment can be replaced by plastic members comparable to the members 36e in FIG. 7.

We claim:

1. Variable heat conduction device for insertion between a heating platen and a cooling platen of a machine making it possible to apply a compressive stress between the said platens, said device being characterized in that it comprises two plates, which can be inserted between the platens and define between them a vacuum insulating space, and at least one deformable member bearing on each of the said plates, said member occupying an expanded state in which the plates are thermally insulated from one another by the vacuum insulation space when said stress is not applied, whereas, when the compressive stress is applied, the member occupies a compressed state in which the plates are engaged and are in thermal contact with one another.

2. Device according to claim 1, wherein the deformable member is an elastic member.

3. Device according to claim 1, wherein the deformable member is a plastic member.

4. Device according to claim 1, wherein the deformable member also comprises a tight member interposed between the said plates and internally defining said vacuum insulating space.

5. Device according to claim 4, wherein the deformable member belongs to a stack having at least one rigid, tight annular element.

6. Device according to claim 5, wherein the annular element is fixed to one of the plates by dismantlable fixing means.

7. Device according to claim 5, wherein said annular element is made from a thermally insulating material.

8. Device according to claim 1 comprising several deformable members distributed between the plates and bearing in thermally insulated cavities, formed in facing surfaces of the plates, thermally insulating sealing means connecting the peripheral edges of the plates and internally defining said vacuum insulating space, which extends between the plates when said members occupy their expanded position.

9. Device according to claim 8, wherein the sealing means comprise a ring of a thermally insulating material, and sealing joints interposed between the said ring and the peripheral edges of the plates.

10. Device according to claim 1, wherein the plate adjacent to the cooling platen is covered with a ductile material layer on the side of the heating platen.

11. Device according to claim 1, wherein the plate adjacent to the heating platen is covered by a conduction sheet formed from juxtaposed sheet elements made from different heat conduction materials on the side of the cooling platen.

12. Device according to claim 1, wherein the facing surfaces of the plates adjacent to the cooling platen and the heating platen are respectively reflecting and covered by a black body.

* * * * *